United States Patent [19]

Frisch

[11] 3,725,319

[45] Apr. 3, 1973

[54] LOW SMOKE GENERATING PLASTIC COMPOSITIONS

[75] Inventor: Kurt C. Frisch, Grosse Ile, Mich.

[73] Assignee: Owens-Corning Fiberglas Corporation

[22] Filed: Mar. 28, 1972

[21] Appl. No.: 238,938

Related U.S. Application Data

[63] Continuation-in-part of Ser. No. 33,894, May 1, 1970, abandoned, which is a continuation-in-part of Ser. No. 11,913, Feb. 16, 1970, abandoned.

[52] U.S. Cl. ..260/2.5 AW, 260/2.5 AJ, 260/77.5 NC
[51] Int. Cl. ....C08g 51/56, C08g 22/34, C08g 22/44
[58] Field of Search......260/2.5 AW, 2.5 BB, 2.5 AJ, 260/2.5 FP, 77.5 NC

[56] References Cited

UNITED STATES PATENTS 3,549,564  12/1970  Parker..............................260/2.5 AJ

*Primary Examiner*—Donald E. Czaja
*Assistant Examiner*—C. Warren Ivy
*Attorney*—Staelin & Overman

[57] ABSTRACT

This disclosure concerns isocyanurate-urethane plastic compositions having low smoke generating properties under fire conditions. Reduction of smoke generation is achieved by the addition to the plastic compositions of an alkali metal fluoroborate or ammonium fluoroborate or mixtures thereof.

7 Claims, No Drawings

LOW SMOKE GENERATING PLASTIC COMPOSITIONS

This application is a continuation-in-part of my copending application Ser. No. 33,894 filed May 1, 1970 now abandoned, and which in turn is a continuation-in-part of application Ser. No. 11,913 filed Feb. 16, 1970 and now abandoned.

BACKGROUND OF THE INVENTION

This invention relates to isocyanurate-urethane plastic compositions and products made therefrom. More particularly, this invention relates to specific additives which may be combined with these compositions to reduce the amount of smoke generated by them when exposed to fire.

Due to their exceptional physical and chemical properties, isocyanurate-urethanes, both non-cellular and cellular or foamed, are being used in ever increasing numbers of commercial applications. Non-cellular isocyanurate-urethanes are frequently employed as coatings, castings and moldings. The cellular or foamed materials are often used as thermal insulation.

In many of the actual and potential commercial applications in which these materials are used, the amount of smoke generated by them under fire conditions is an important factor to be considered in choosing these materials over other materials of otherwise comparable qualities. This is particularly true in the case of foamed isocyanurate-urethanes used as thermal insulation in commercial and residential construction, where the reduction of smoke generation under fire conditions can have significant safety advantages.

SUMMARY OF THE INVENTION

The amount of smoke generated under fire conditions by isocyanurate-urethane materials is substantially reduced by the addition to these materials of an alkali metal fluoroborate or ammonium fluoroborate or combinations thereof.

DESCRIPTION OF THE INVENTION

This invention relates to the reduction of smoke generated by isocyanurate-urethanes and products made from them when they are subjected to fire conditions. It has been discovered that the addition to these compositions of an alkali metal fluoroborate such as potassium fluoroborate ($KBF_4$) or sodium fluoroborate ($NaBF_4$) as well as ($NH_{fluoroborate\ (KBF_4}BF_4$) will reduce smoke generation by about 10—60 percent as compared to these compositions without such additives.

It is believed that cryolite ($Na_3AlF_6$), $Na_2SiF_6$, borosilicates, aluminum silicates and the like would also reduce smoke generation in isocyanurate-urethane compositions. Other smoke reducing agents might include organic complexes of $BF_3$ or $SiF_4$ or the like such as amine complexes of $BF_3$ or polyol complexes of $BF_3$.

This reduction of smoke by means of an alkali metal fluoroborate or ammonium fluoroborate is unexpected even though materials such as $KBF_4$ have been used in other isocyanate based systems. The prior art has added $KBF_4$, usually as a flame retardant, to alkyl halide resin modified polyurethane foams. U.S. Pat. No. 3,549,564 issued to Parker et al. on Dec. 22, 1970 discloses the use of $KBF_4$ as a flame retardant in urethane foams. In the systems contemplated by this invention, however, alkyl halide resins are not deemed necessary nor particularly desirable in the plastic compositions. In addition, the additive in this invention functions principally as a smoke reducing agent in isocyanurate-urethane systems.

As used herein the term "isocyanurate" or "polyisocyanurate" refers to a composition having isocyanurate rings in its structure; these rings are generally depicted as

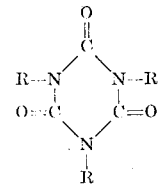

and are believed to be produced in accordance with the following representative equation

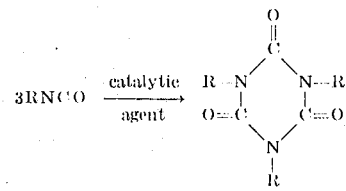

It is known in the art that the trimerization or polymerization of organic isocyanates having the formula RNCO, urethane prepolymers having reactive —NCO groups, or other materials having reactive —NCO groups attached thereto, for example, polyamide prepolymers, or combinations of these compounds, in the presence of a suitable catalytic agent and preferably one or more polyols will yield polymers referred to as isocyanurates, isocyanurate-urethanes or, for example, isocyanurate-amides or isocyanurate-urethane-amides. In all of these compounds the above described isocyanurate ring structure is present.

Urethanes or polyurethanes can be formed by a variety of methods, although the most widely used production method is the reaction of di- or polyfunctional hydroxyl compounds, for example, hydroxyl-terminated polyesters or polyethers, with di- or polyfunctional isocyanates. The general structure of a linear polyurethane derived from a dihydroxy compound, HOROH, and a diisocyanate, OCNR'NCO, can be represented by the following general formula:

$$\left( R-O-\overset{O}{\underset{\|}{C}}-NH-R'-NH-\overset{O}{\underset{\|}{C}}-O- \right)_n$$

In the isocyanurate-urethane (polyisocyanurate-polyurethane) compositions disclosed herein there is a combination of isocyanurate and urethane linkages or structure. Of the total isocyanate used in these compositions some of it is trimerized or polymerized to form isocyanurate rings and some of it is reacted with one or more polyols to form urethane linkages.

It has been found that the smoke reducing agents disclosed herein work well with isocyanurate-urethane plastic compositions. These compositions are formed by controlling the NCO/OH *ratio (* The NCO/OH ratio is determined by using the formula:

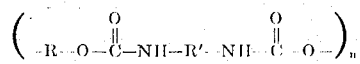

) of the isocyanate and polyol reactants so that a certain percentage of the total available isocyanate can react with the polyol to form urethane structure and the remainder of the isocyanate can trimerize to form isocyanurate structure. It has been found that by maintaining the NCO/OH ratio between about 4 to 1 and 20 to 1 isocyanurate-urethane plastic compositions can be produced comprising from about 5 to 25 percent urethane and 75 to 95 percent isocyanurate. It has been discovered that when isocyanurate-urethane plastic compositions within these ranges are combined with 0.1 to 30 percent by weight (by weight of isocyanate, polyol, catalyst and surfactant) and preferably 5 to 20 percent by weight of the smoke depressing agents disclosed herein, smoke generation under fire conditions can be reduced by about 10 to 60 percent.

Suitable isocyanates or reactive -NCO containing compounds which may be employed in practicing the invention include: 2,4-tolylene diisocyanate; 2,6-tolylene diisocyanate; p-phenylene diisocyanate; polymethylene polyphenylisocyanate; diphenylmethane diisocyanate; m-phenylene diisocyanate; hexamethylene diisocyanate; butylene-1,4-diisocyanate; octamethylene diisocyanate; 3,3'-dimethoxy-4,4'-biphenylene diisocyanate; 1,18-octadecamethylene diisocyanate; polymethylene diisocyanate; benzene triisocyanate; naphthylene-2,4-diisocyanate, 3,3'-dimethyl-4,4'-biphenylene diisocyanate; 1-methoxy phenylene-2,4-diisocyanate; diphenylene-4,4'-diisocyanate, 4,4'-diisocyanato diphenyl ether; naphthylene-1,5-diisocyanate; diisocyanato-dicyclohexyl-methane; p-xylylene diisocyanate; xylylene diisocyanate; hydrogenated diphenylene diisocyanate; hydrogenated diphenyl methane diisocyanate; toluene-2,4,6-triisocyanate; 3-methyl-4,6,4'-triisocyanate diphenylmethane; 2,4,4'-triisocyanato diphenyl; 2,4,4'-triisocyanato diphenyl ether; long chain hydrocarbons and substituted hydrocarbons terminated with —NCO radicals and mixtures thereof. Prepolymers having reactive isocyanate or —NCO groups may also be used.

Suitable polyols (hydroxy terminated or polyhydric compounds) which may be reacted with the isocyanate or —NCO containing compounds include by way of example: polyalkylene ether glycols, triols and so forth having up to 8 hydroxyl groups, and the polyhydric polyesters obtained by the reaction of a dicarboxylic acid with one or more polyhydric alcohols such as diol, triol, tetrol to produce a hydroxy terminated polyester. Examples of polyhydric compounds include branched chain polyols of hydroxyl terminated condensation products of propylene oxide or of mixed ethylene and propylene oxides or other alkylene oxides with polyhydric alcohols of 2 to 8 hydroxyl groups such as with ethylene glycol, glycerol, 1,3,6-hexanetriol, pentaerythritol, sorbitol, sucrose, and methyl glucoside, or with diamines, and triamines; linear polyols such as dipropylene glycol, tripropylene glycol, polypropylene ether glycol, polyisopropylene ether glycol, polyethylene propylene ether glycol, polyethylene ether glycol, polyhexamethylene ether glycol, polytetramethylene ether glycol and liquid hydroxy terminated polyesters formed by reaction of a dicarboxylic acid such as adipic or sebacic acid or their anhydrides with one or more of the above glycols or with a small amount of a higher polyol, e.g., hexanetriol, or pentaerythritol to give some branching. Small amounts of amines or amino alcohols can also be used in making polyesters. Mixtures of these polyols can be used also.

To produce foamed or cellular isocyanurate-urethane compounds, blowing agents such as Freon 11 ($CCl_3F$) or Freon 12 ($CCl_2F_2$) are employed with the isocyanurate-urethane forming ingredients; a surfactant which aids cell formation during foaming is also generally included.

The smoke depressing agents found to be most effective in these isocyanurate-urethane systems are $KBF_4$ and $NH_4BF_4$. The beneficial smoke depressing effects of these fluoroborates is believed to reside in the ability of their decomposition products, i.e., $BF_3$ and KF or $NH_4F$, to act as chain stoppers for free radicals generated during the decomposition of the foams. Instead of free radicals, such as carbon radicals, polymerizing to form smoke generating components, they are tied up by the fluoroborate decomposition products and made too bulky to be given off as smoke. It is also theorized that these decomposition products add across the double bonds of olefinic decomposition products known to contribute to smoke generation and make these products too bulky to be released as smoke. In both of these possible routes leading to smoke reduction, the fluoroborate would assert its beneficial effects under fire conditions.

These theories used to explain the desirable action of the disclosed smoke depressing agents should not be construed as limiting the scope of the invention. The disclosed agents are useful in reducing smoke generation under fire conditions and their usefulness should not be limited solely to their theoretical mode of operation.

It has been found that additions of from 0.1 to 30 percent by weight and preferably 5 to 20 percent * (* The terms "percent" and "parts" are used herein and in the appended claims to refer to percent and parts by weight, unless otherwise indicated.) by weight of my smoke depressing agents (based on the weight of the isocyanurate-urethane composition solids) reduces smoke generation by a significant amount.

The following Table 1 gives eight isocyanurate-urethane foam formulations (Samples A through H) containing from 0 to 20 percent by weight $KBF_4$ based on the weight of foaming solids, i.e., isocyanate, polyol, surfactant and catalyst; each ingredient is listed in parts by weight:

TABLE 1

| Ingredient | Samples | | | | | | | |
|---|---|---|---|---|---|---|---|---|
| | A | B | C | D | E | F | G | H |
| Isocyanate | 400 | 400 | 400 | 400 | 400 | 400 | 400 | 400 |
| Polyol | 80 | 80 | 80 | 80 | 80 | 80 | 80 | 80 |
| Surfactant | 8 | 8 | 8 | 8 | 8 | 8 | 8 | 8 |
| Catalyst | 40 | 40 | 40 | 40 | 40 | 40 | 40 | 40 |
| Blowing Agent | 93 | 95 | 97.5 | 100 | 102.5 | 108 | 109 | 111.8 |
| $KBF_4$ | 0 | 10.56 | 26.4 | 39.6 | 52.8 | 85.2 | 92.5 | 105 |

In each of the above Samples A through H the ingredients are identical. The isocyanate is Mobay Chemical Company's "Mondur MR" a polyphenyl polyisocyanate having 31.5 to 32 percent available isocyanate; the polyol is a poly(oxypropylene glycol having an OH number of 415 supplied by Wyandotte Chemical Corp. as "P-170"; the surfactant is Dow Corning's "DC-201" a silicone-glycol copolymer with silicon-oxygen-carbon bonds; Rohm & Haas' "DMP-30" 2,4,6-tris(dimethylaminomethyl) phenol, is the catalyst and the blowing agent is DuPont's "F11B" trichlorofluoromethane. The amounts of $KBF_4$ were varied from 0 to 105 parts by weight, corresponding to 0 to 20 percent by weight of $KBF_4$ based on the weight of foaming solids, i.e., isocyanate, polyol, surfactant and catalyst.

The NCO/OH ratio for Samples A through H is 14.5. This means that the polyol can consume about 7 percent of the total available isocyanate to form urethane structure, leaving about 93 percent of the isocyanate available to trimerize in the presence of the trimerization catalyst to form isocyanurate rings. Thus in isocyanurate-urethane Samples A through H approximately 7 percent of the foam is urethane and 93 percent is isocyanurate.

Foam Samples A through H were prepared by a one-shot method comprising adding the surfactant and the blowing agent to the polyol, and then adding to this mixture the isocyanate and then catalyst. The mixture was stirred until creaming commenced and then quickly poured into a mold and allowed to rise. Each sample was cured at room temperature for at least two weeks prior to testing.

Smoke density or obscuration was determined for each sample using a Rohm & Haas XP-2 Smoke Chamber. This test apparatus has a light source which is obscured to a certain percent (from 0 to 100 percent) depending upon the amount of smoke generated by the selected test specimen when it is exposed to a flame source. Samples A, C, E, F and H above were tested in the XP-2 Smoke Chamber and the amount of light obscured after exposing each sample to the flame source for 30 seconds was recorded. This date is shown in the following Table 2:

TABLE 2

| Amount of $KBF_4$ | % Light Obscured (in 30 seconds) |
|---|---|
| 0 (Sample A) | 60% |
| 5% (Sample C) | 53% |
| 10% (Sample E) | 35% |
| 16% (Sample F) | 40% |
| 20% (Sample H) | 48% |

The above Table 2 indicates that isocyanurate-urethane materials having from 5 to 20 percent by weight $KBF_4$ (based on the weight of foaming solids) can reduce the amount of smoke generated by 12 to 42 percent as compared to the same materials not containing $KBF_4$.

As shown in Table 2, the smoke generation of Samples F (16% $KBF_4$) and H (20% $KBF_4$) is somewhat greater than that of Sample E which has a lesser amount of $KBF_4$. This fact is believed due to the incomplete or non-uniform dispersion of the larger amounts of $KBF_4$ employed in Samples F and H.

The following Examples 1 through 8 set forth isocyanurate-urethane foam formulations containing varying amounts of the smoke depressing agents disclosed herein and compare their smoke and flame values with similar formulations not containing an alkali metal fluoroborate or ammonium fluoroborate. The smoke and flame values given in these examples were obtained after each sample had aged at least one week. The smoke and flame readings were determined by using a small scale laboratory tunnel test whose results correlate or are equivalent to those obtained in Underwriters Laboratory E-84 tunnel test.

EXAMPLE 1

| Ingredients | Parts by Weight Sample $J_1$ | Sample $J_2$ |
|---|---|---|
| Isocyanate (Mondur MR) | 100 | 100 |
| Polyol (TP 440; Wyandotte) | 15 | 15 |
| Catalyst (DMP-30) | 9 | 14 |
| Surfactant (DC-193) | 2 | 2 |
| Blowing Agent (F11B) | 18 | 20 |
| Flame Retardant (Stauffer CEF) | 15 | 15 |
| $KBF_4$ | — | 15 |
| Smoke: | 120 | 85 |
| Flame: | 26 | 27 |
| % Smoke Reduction | | 29% |

EXAMPLE 2

| Ingredients | Parts By Weight Sample $K_1$ | Sample $K_2$ |
|---|---|---|
| Isocyanate (Mondur MR) | 100 | 100 |
| Polyol (Hertrofoam 320) | 15 | 15 |
| Catalyst (DMP-30) | 9 | 14 |
| Surfactant (DC-193) | 2 | 2 |
| Blowing Agent (F11B) | 18 | 20 |
| Flame Retardant | — | — |
| $KBF_4$ | — | 15 |
| Smoke: | 80 | 45 |
| Flame: | 24 | 23 |
| % Smoke Reduction: | | 43% |

EXAMPLE 3

| Ingredients | Parts By Weight Sample $L_1$ | Sample $L_2$ |
|---|---|---|
| Isocyanate (Mondur MR) | 100 | 100 |
| Polyol (Hetrofoam 320) | 15 | 15 |
| Catalyst (DMP-30) | 9 | 13 |
| Surfactant (DC-193) | 2 | 2 |
| Blowing Agent (F11B) | 18 | 22 |
| Flame Retardant (Stauffer CEF) | 15 | 15 |
| $KBF_4$ | — | 15 |
| Smoke: | 150 | 65 |
| Flame: | 25 | 25 |
| % Smoke Reduction: | | 57% |

EXAMPLE 4

| Ingredients | Parts By Weight Sample $M_1$ | Sample $M_2$ |
|---|---|---|
| Isocyanate (Mondur MR) | 100 | 100 |
| Polyol (R-350X) | 15 | 15 |
| Catalyst (DMP-30) | 9 | 12 |
| Surfactant (DC-193) | 2 | 2 |
| Blowing Agent (F11B) | 18 | 22 |
| Flame Retardant (Stauffer CEF) | 15 | 15 |
| $KBF_4$ | — | 15 |
| Smoke: | 100 | 70 |
| Flame: | 24 | 24 |
| % Smoke Reduction: | | 30% |

EXAMPLE 5

| Ingredients | Parts By Weight Sample $N_1$ | Sample $N_2$ |
|---|---|---|
| Isocyanate (Mondur MR) | 100 | 100 |
| Polyol (R-350X) | 15 | 15 |
| Catalyst (DMP-30) | 9 | 12 |
| Surfactant (DC-193) | 2 | 2 |
| Blowing Agent (F11B) | 16 | 20 |
| Flame Retardant | — | — |
| $KBF_4$ | — | 15 |
| Smoke: | 90 | 55 |

| | | |
|---|---|---|
| Flame: | 26 | 25 |
| % Smoke Reduction: | | 39% |

EXAMPLE 6

| Ingredients | Parts By Weight | |
|---|---|---|
| | Sample P₁ | Sample P₂ |
| Isocyanate (Mondur MRS) | 100 | 100 |
| Polyol (TP-440) | 15 | 15 |
| Catalyst (DMP-30) | 13 | 14 |
| Surfactant (DC-193) | 2 | 2 |
| Blowing Agent (F11B) | 18 | 22 |
| Flame Retardant (Stauffer CEF) | 15 | 15 |
| $KBF_4$ | — | 15 |

| | | |
|---|---|---|
| Smoke: | 140 | 90 |
| Flame: | 26 | 27 |
| % Smoke Reduction: | | 36% |

EXAMPLE 7

| Ingredients | Parts By Weight | |
|---|---|---|
| | Sample R₁ | Sample R₂ |
| Isocyanate (Mondur MRS) | 100 | 100 |
| Polyol (Hetrofoam 320) | 15 | 15 |
| Catalyst (DMP-30) | 12 | 14 |
| Surfactent (DC-193) | 2 | 2 |
| Blowing Agent (F11B) | 18 | 22 |
| Flame Retardant (Stauffer CEF) | 15 | 15 |
| $KBF_4$ | — | 15 |

| | | |
|---|---|---|
| Smoke: | 100 | 70 |
| Flame: | 23 | 23 |
| % Smoke Reduction: | | 30% |

EXAMPLE 8

| Ingredients | Parts By Weight | |
|---|---|---|
| | Sample T₁ | Sample T₂ |
| Isocyanate (Mondur MR) | 100 | 100 |
| Polyol (Hetrofoam 320) | 30 | 30 |
| Catalyst (DMP-30) | 13 | 10 |
| Surfactant (DC-193) | 2 | 2 |
| Blowing Agent (F11B) | 22 | 18 |
| $NH_4BF_4$ | — | 15 |

| | | |
|---|---|---|
| Smoke: | 165 | 95 |
| Flame: | 29 | 27.5 |
| % Smoke Reduction: | | 42% |

EXAMPLE 9

| Ingredients | Parts By Weight | |
|---|---|---|
| | Sample V₁ | Sample V₂ |
| Isocyanate (Mondur MR) | 950 | 950 |
| Polyol (TP-440) | 50 | 50 |
| Catalyst (DMP-30) | 85.5 | 95 |
| Surfactant (DC-193) | 19 | 19 |
| Blowing Agent | 156 | 170 |
| Flame Retardant (Stauffer CEF) | 142.5 | 142.5 |
| $KBF_4$ | — | 85 |

| | | |
|---|---|---|
| Smoke: | 50 | 40 |
| Flame: | 28 | 26 |
| % Smoke Reduction: | | 20% |

In the above Examples 1 through 9, the isocyanate is Mobay's "Mondur MR" or "Mondur MRS," both polyphenyl polymethylene polyisocyanates having 31.5 to 32 percent available isocyanate with a hydroxyl equivalent of 420; the polyol is either Wyandotte's "TP-440" (a polyoxypropylene derivative of trimethylolpropane having an OH number of 425), Hooker Chemical Corporation's "Hetrofoam 320" (a polyol composition comprised of a polyester made from chlorendic acid and a polyhydric alcohol, the polyol having an OH number of 345) or Jefferson Chemical Company's "R-350X" (an alkylene oxide adduct of the Mannich reaction product of a phenolic compound with formaldehyde and an alkanolamine having an OH number of 530). The surfactant is Dow Corning's "DC-193," a silicone-glycol copolymer with direct silicon-carbon bonds. The flame retardant "CEF," is tris (2-chloroethyl) phosphate available from Stauffer Chemical Corporation.

The NCO/OH ratio and the perecntages of isocyanate that is available to trimerize and form isocyanurate or react with the polyol to form urethane in Examples 1 through 9 are given in the following Table 3.

TABLE 3

| Example NO. | NCO/OH | % isocyanate available for isocyanurate formation | % isocyanate available for urethane formation |
|---|---|---|---|
| 1 | 6.6 | 85 | 15 |
| 2 | 8.1 | 88 | 12 |
| 3 | 8.1 | 88 | 12 |
| 4 | 5.2 | 81 | 19 |
| 5 | 5.2 | 81 | 19 |
| 6 | 6.6 | 85 | 15 |
| 7 | 6.6 | 85 | 15 |
| 8 | 4.0 | 75 | 25 |
| 9 | 19 | 95 | 5 |

In each of the above Examples 1 through 9 two substantially identical isocyanurate-urethane compositions are compared; the only significant difference between the pairs of samples being the inclusion in one of the samples of $KBF_4$ or $NH_4BF_4$ and the exclusion of this substance in the other. The comparative data of these examples shows that additions of an alkali metal fluoroborate or ammonium fluoroborate will reduce the amount of smoke generated by isocyanurate-urethane compounds by as much as 50 percent. These results are obtained when the fluoroborates are employed in amounts of 0.1 to 30 percent by weight and preferably 5 to 20 percent by weight, based on the weight of solids of isocyanurate-urethane compounds comprising 75 to 95 percent isocyanurate and 5 to 25 percent urethane. In general, it has been found that the use of these agents in excess of 30 percent by weight has little effect on further smoke reduction.

Although illustrated above in foamed or cellular isocyanurate-urethane systems, the smoke depressing agents disclosed herein may also be employed in non-cellular isocyanurate-urethane compositions.

Various modifications may be made within the spirit and scope of the following claims.

I claim:

1. An isocyanurate-urethane composition formed by reacting, in an NCO/OH ratio of from 4/1 to 20/1, one or more compounds having reactive —NCO groups with one or more polyols having reactive —OH groups: said isocyanurate-urethane composition including a smoke reducing agent selected from the group consisting of an alkali metal fluoroborate, ammonium fluoroborate and mixtures thereof wherein said smoke reducing agent is employed in an amount equal to 0.1 to 30 percent by weight of said composition solids.

2. The composition of claim 1 further characterized by 5 to 25 percent of said compounds having reactive —NCO groups reacting with said compounds having reactive —OH groups to form urethane linkages, thereby leaving 75 to 95 percent of said compounds having reactive —NCO groups to trimerize and form isocyanurate rings.

3. The composition of claim 1 wherein said smoke reducing agent is an alkali metal fluoroborate.

4. The composition of claim 3 wherein said alkali metal fluoroborate is potassium fluoroborate, $KBF_4$.

5. The composition of claim 1 wherein said smoke reducing agent is employed in an amount equal to 5 to 20 percent by weight of said composition solids.

6. A thermal insulating, foamed plastic isocyanurate-urethane product formed by reacting, in an NCO/OH ratio of 4 to 1 to 20 to 1 and in the presence of an —NCO trimerization catalyst, one or more compounds having reactive —NCO groups with one or more polyols having reactive —OH groups;

said isocyanurate-urethane product containing a smoke reducing agent selected from the group consisting of an alkali metal fluoroborate, ammonium fluoroborate and mixtures thereof;

said smoke reducing agent being employed in an amount equal to 0.1 to 30 percent by weight of said isocyanurate-urethane product solids.

7. The product of claim 6 wherein said smoke reducing agent is potassium fluoroborate, $KBF_4$.

* * * * *